United States Patent
Brooker et al.

(10) Patent No.: US 6,478,255 B1
(45) Date of Patent: Nov. 12, 2002

(54) CRASH ENERGY ABSORBING GLARESHIELD AND METHOD OF PROTECTING AGAINST HEAD INJURY IN AIRCRAFT CRASHES

(75) Inventors: Kevin Ronnie Brooker, Haltom City, TX (US); Michael Reaugh Smith, Colleyville, TX (US); Timothy Myron Hazen, Keller, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

(21) Appl. No.: 09/765,849

(22) Filed: Jan. 19, 2001

Related U.S. Application Data

(60) Provisional application No. 60/177,317, filed on Jul. 21, 2000.

(51) Int. Cl.[7] .................................................. B60J 3/00
(52) U.S. Cl. ........................................ 244/121; 280/752
(58) Field of Search ............................ 244/121, 118.5; 280/751, 752

(56) References Cited

U.S. PATENT DOCUMENTS

| | | | |
|---|---|---|---|
| 1,929,314 A | * | 10/1933 | Ishii |
| 2,032,711 A | * | 3/1936 | Moles |
| 2,403,195 A | * | 7/1946 | Ross |
| 2,560,009 A | * | 7/1951 | Straith |
| 2,606,755 A | * | 8/1952 | Samuels |
| 2,626,163 A | * | 1/1953 | Scantlebury |
| 2,813,749 A | * | 11/1957 | Wetig |
| 3,704,844 A | * | 12/1972 | Wolf |
| 4,373,745 A | * | 2/1983 | Matsuno |
| 5,558,300 A | * | 9/1996 | Kalberer et al. |
| 5,582,363 A | * | 12/1996 | Davis |

\* cited by examiner

Primary Examiner—Charles T. Jordan
Assistant Examiner—T. Dinh
(74) Attorney, Agent, or Firm—James E. Walton; Hill & Hunn, LLP; Melvin A. Hunn

(57) ABSTRACT

An improved vehicle glareshield having a structural body having a predetermined size and shape adapted to protect an instrument panel in a vehicle from glare; and a plurality of controlled strength members carried in said structural body which collapse in a controlled manner upon high force impact by an occupant in order to reduce a deceleration force experienced by an occupant upon impact with said instrument panel.

5 Claims, 2 Drawing Sheets

CRASH ENERGY ABSORBING GLARESHIELD AND METHOD OF PROTECTING AGAINST HEAD INJURY IN AIRCRAFT CRASHES

This application claims the benefit and filing date of U.S. Provisional Patent Application No. 60/177,317, filed Jan. 21, 2000, titled, "Crash Energy Absorbing Glareshield and Method of Protecting Against Head Injury in Aircraft Crashes."

BACKGROUND OF THE INVENTION

1. Field of the Invention

The present invention relates in general to glareshields for use in vehicles, particularly in fixed and rotor wing aircraft. More particularly, in particular to glareshields that enhance safety during aircraft crashes.

2. Description of the Prior Art

While significant progress has been made to increase the safety of fixed wing and rotor wing aircraft, a significant number of crashes still occur. However, the survivability of aircraft crashes has increased with incremental advances in the engineering of the aircraft and of the aircraft components. Head injuries, in particular, must be avoided in order to further increase the overall survivability.

This has been demonstrated in automobile safety advances, such as the implementation of air bag safety equipment, which protect the head and upper body of the driver and passenger in the front seats. A comparable situation arises in aircraft. The pilot and copilot are restrained by safety belts and safety harnesses. In longitudinal crashes, the restrained crew member experiences significant forward head motion which sometimes causes the head to strike the glareshield and/or instrument panel. This can cause severe injury or death in a crash which would have been otherwise survivable.

SUMMARY OF THE INVENTION

The present invention is directed to an improved glareshield for use in vehicles, particularly in fixed wing and rotary wing aircraft, or in combination or hybrid aircraft, such as an aircraft with tilting rotor assemblies which allow both a fixed wing mode of flight and a rotor wing mode of flight, i.e., a tiltrotor aircraft.

More particularly, the present invention is directed to an improved glareshield which includes multiple portions of varying strength which allow the glareshield to fold or collapse in a controlled manner when it is struck by the head or helmet of a crew member during a crash, thus reducing the deceleration force experienced by the head, and thereby enhancing safety and increasing survivability.

Still more particularly, the present invention is directed to an improved glareshield which includes an array of high strength segments oriented within the glareshield in a predetermined pattern which defines a plurality of portions of the glareshield which, in effect, act as "hinges" to allow the controlled folding or collapsing of the glareshield when struck. This folding process absorbs kinetic energy from the occupant's head and helmet at controlled levels below the injury threshold.

During impact, the improved glareshield of the present invention folds down over the instrument panel, which is underneath it, allowing the energy-absorbing padded top surface of the glareshield to protect the head from a high force impact with the hard portion of the instrument panel.

In accordance with the preferred embodiment of the present invention, the glareshield includes a layer of foam pad which has a nonlinear stiffness and a low coefficient of restitution to maximize the amount of energy absorbed by the head.

The improved glareshield of the present invention functions somewhat like a pre-deployed air bag to protect the from head injury during a crash. However, it is entirely a passive device, which does not need to be instantaneously deployed at the moment of impact. It is a relatively low-cost and fail-safe means for reducing head injury that requires no moving parts and no deployment mechanisms.

The above as well as additional objectives, features, and advantages will become apparent in the following description.

BRIEF DESCRIPTION OF THE DRAWINGS

The novel features believed characteristic of the invention are set forth in the appended claims. The invention itself however, as well as a preferred mode of use, further objectives, and advantages thereof, will best be understood by reference to the following detailed description of the preferred embodiment when read in conjunction with the accompanying drawings, wherein:

DETAILED DESCRIPTION OF THE INVENTION

Figure 1:
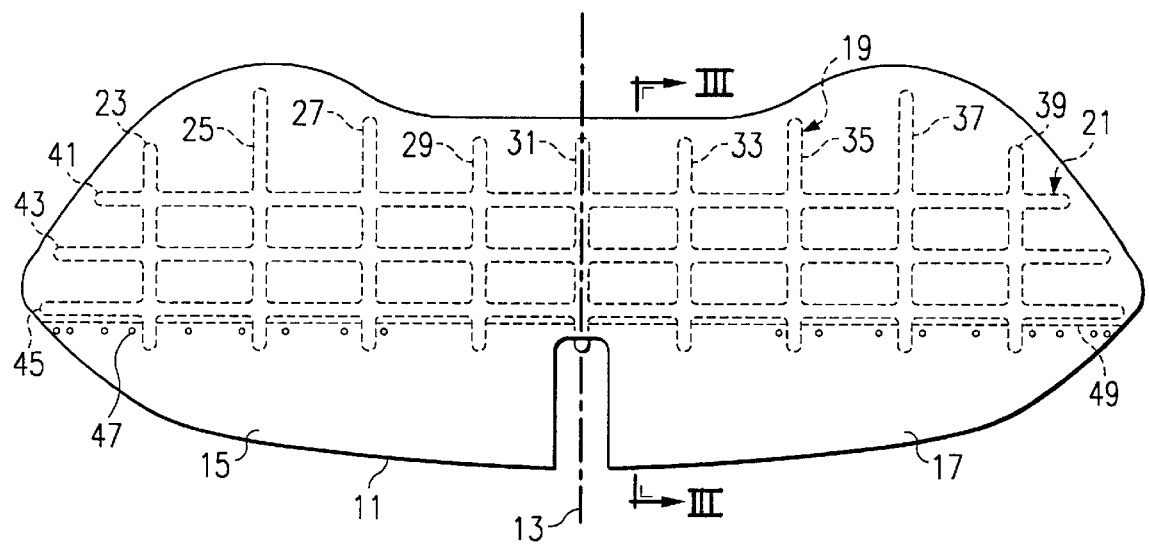
FIG. 1 is a fragmentary pictorial representation of one preferred embodiment of the improved glareshield of the present invention in a top or plan view.

FIG. 1 is a fragmentary view of the preferred, but not exclusive, embodiment of the improved glareshield of the present invention. The view is "fragmentary" since a number of internal components, which would not ordinarily be visible, are depicted. Glareshield 11 is preferably symmetrical about center line 13, defining a left side portion 15 and a right side portion 17. A plurality of generally longitudinal stiffening beads 19 and lateral stiffening beads 21 are depicted in this view. These components would not be visible during use. They are depicted in this view to define the orientation of the longitudinal and lateral stiffening beads 19, 21 relative to the glareshield 11. The stiffening beads 19, 21 represent regions having a greater bending strength in one axis and weaker in the transverse axis relative to the remaining and surrounding portions of the glareshield 11.

The stiffening beads 19, 21 and the weaker surrounding material which forms the glareshield 11 function as multiple and alternating portions of varying strength which allow the glareshield 11 to fold or collapse in a controlled manner when it is struck by the head of a crew member during a crash, thus reducing below injury levels the deceleration force experienced by the head, and thereby enhancing safety and increasing survivability.

Characterized another way, glareshield 11 includes an array of high strength segments oriented within the glareshield 11 in a predetermined pattern which defines a plurality of portions of the glareshield 11 which, in effect, act as "hinges" to allow the controlled folding or collapsing of the glareshield when struck. During impact, the improved glareshield of the present invention folds down over the instrument panel (not visible in this view) which is underneath it allowing the padded top surface of the instrument panel to protect the head from a high force impact with the hard portion of the instrument panel.

Referring once again to FIG. 1, a number of longitudinal stiffening beads 19 are present within glareshield assembly 11 including stiffening beads 23, 25, 27, 29, 31, 33, 35, 37, and 39. Additionally, there are a number of individual stiffening beads 21 which are oriented generally orthogonal to the longitudinal stiffening beads 19. In the view of FIG. 1, lateral stiffening beads 41, 43, and 45 are depicted. Together the lateral and longitudinal stiffening beads 19, 21 define a sort of skeletal structure within glareshield assembly 11 which provide controlled strength in particular portions of glareshield assembly 11. A number of fasteners 47 are utilized to secure glareshield assembly 11 to instrument panel 49.

Figure 2:
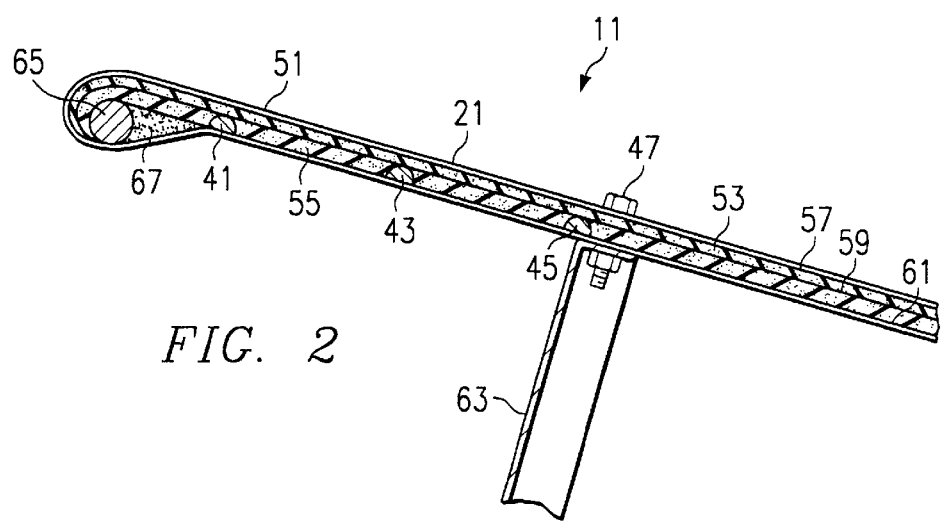
FIG. 2 is a cross-sectional view of the improved glareshield of FIG. 1 as seen along section line III—III.

FIG. 2 depicts a longitudinal section view as taken through glareshield assembly 11 of FIG. 1. As is shown, the glareshield assembly 11 is composed of a number of overlapping materials which are secured and bonded together. The top layer is a cover 51 which is preferably a layer of artificial leather material. Underneath cover 51, there are two layers of energy-absorbing foam padding 53, 55. Adhesive layers 57, 59, 61 are applied between the cover 51 and foam padding 53, 55 to secure these layered components together. In the preferred embodiment, glareshield assembly 11 further includes a stiffening rod 65 that provides additional stiffness primarily to maintain the shape of the glareshield. This stiffening rod is covered by the foam padding layer 55 and provides a small degree of assistance in absorbing kinetic energy from the head during deformation. The lateral stiffening beads 41, 43, 45 are embedded in and surrounded by the foam padding layer 55. They are spaced apart in a predetermined geometric configuration within foam padding 55 and define effective hinge lines within glareshield assembly 11. The view of FIG. 2 also depicts fastener 47 securing glareshield assembly 11 to instrument panel 63.

Figure 3:
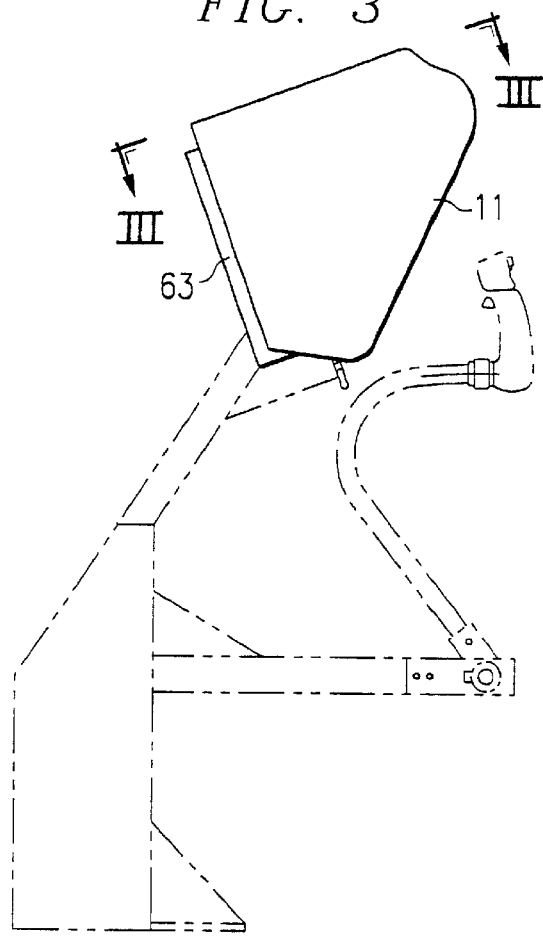
FIG. 3 is a view of the improved glareshield of the present invention in an exemplary installed position.

FIG. 3 is a pictorial representation of the installation of glareshield 11 of the present invention in a helicopter or tiltrotor cockpit mounted above instrument panel 63 in a position which is convenient to the pilot and other crew members.

Figure 4:
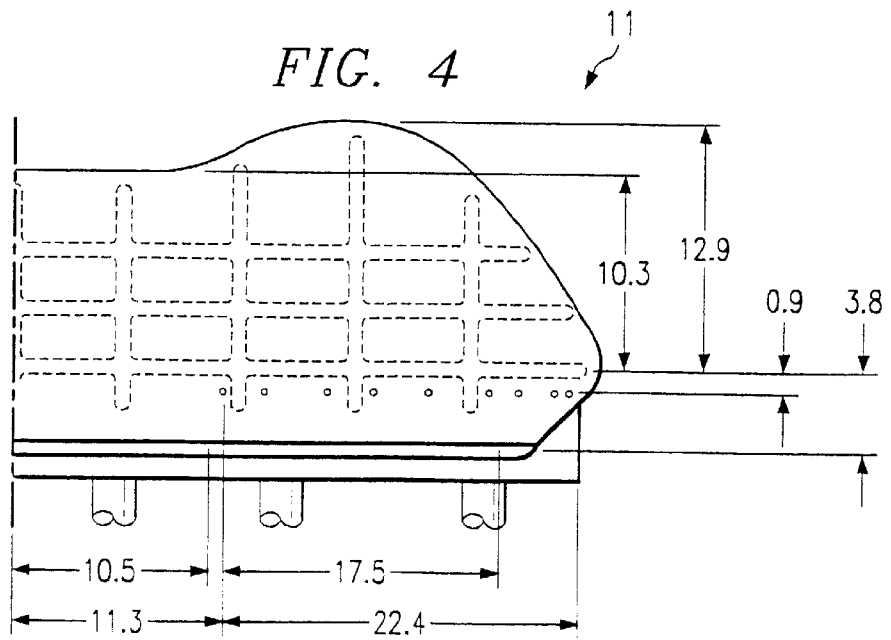
FIG. 4 is a view of the glareshield of the present invention from III—III in FIG. 3.

FIG. 4 is a view of the glareshield of the present invention from III—III in FIG. 3. Some typical dimensions are shown.

In the preferred embodiment of the present invention, the stiffening beads are formed from polycarbonate plastic material sold under the trade name "LEXAN" which is manufactured by GE Plastics.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. An improved vehicle glareshield, comprising:
   a structural body having a predetermined size and shape adapted to protect an instrument panel in a vehicle from glare; and
   a plurality of controlled strength members carried in and of the same material as said structural body which collapse in a controlled manner upon high force impact by an occupant in order to reduce a deceleration force experienced by an occupant upon impact with said instrument panel.

2. The improved vehicle glareshield according to claim 1, wherein said structural body includes at least one cover and at least one layer of foam padding.

3. The improved vehicle glareshield according to claim 1, wherein said plurality of controlled strength members are carried internally within said structural body.

4. The improved vehicle glareshield according to claim 1, wherein said plurality of controlled strength members are oriented in a grid pattern including generally longitudinal members and generally lateral members.

5. The improved vehicle glareshield according to claim 1, wherein a stiffening rod is positioned within said structural body.

* * * * *